(12) United States Patent
Martin et al.

(10) Patent No.: US 11,959,396 B2
(45) Date of Patent: Apr. 16, 2024

(54) GAS TURBINE ENGINE ARTICLE WITH COOLING HOLES FOR MITIGATING RECESSION

(71) Applicant: RAYTHEON TECHNOLOGIES CORPORATION, Farmington, CT (US)

(72) Inventors: Thomas J. Martin, East Hampton, CT (US); Gajawalli V. Srinivasan, South Windsor, CT (US); Paul F. Croteau, Columbia, CT (US); Matthew B. Kennedy, Vernon, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/970,662

(22) Filed: Oct. 21, 2022

(65) Prior Publication Data
US 2023/0212949 A1 Jul. 6, 2023

Related U.S. Application Data

(60) Provisional application No. 63/270,793, filed on Oct. 22, 2021.

(51) Int. Cl.
*F01D 5/18* (2006.01)
*F23R 3/00* (2006.01)

(52) U.S. Cl.
CPC ............. *F01D 5/186* (2013.01); *F23R 3/007* (2013.01); *F05D 2260/202* (2013.01); *F05D 2300/222* (2013.01)

(58) Field of Classification Search
CPC ............... F01D 5/186; F05D 2260/202; F05D 2300/222; F23R 3/002; F23R 3/007; F23R 3/06; F23R 2900/03042
See application file for complete search history.

(56) References Cited

U.S. PATENT DOCUMENTS

| 4,497,610 A | * | 2/1985 | Richardson | F01D 9/04 415/117 |
| 4,529,358 A | * | 7/1985 | Papell | F01D 5/186 415/115 |

(Continued)

FOREIGN PATENT DOCUMENTS

| CN | 208845235 U | * | 5/2019 | ............. F01D 5/146 |
| CN | 112443361 A | * | 3/2021 | |

OTHER PUBLICATIONS

Opila, E.J. and Gray, H. (2002). Oxidation and volatilization of silica-formers in water vapor. Retrieved from: https://ntrs.nasa.gov/citations/20020070889.

(Continued)

*Primary Examiner* — John M Zaleskas
(74) *Attorney, Agent, or Firm* — Carlson, Gaskey & Olds, P.C.

(57) ABSTRACT

A gas turbine engine article includes a silicon-containing ceramic wall that has an external combustion gaspath side and an internal side that borders a cooling air cavity. The external combustion gaspath side has an associated combustion gas flow direction there along. An array of cooling holes extends through the silicon-containing ceramic wall and connects the internal side with the external combustion gaspath side. The cooling holes are oriented to discharge cooling air to the external gaspath side in a direction counter to the combustion gas flow direction.

10 Claims, 3 Drawing Sheets

(56) References Cited

U.S. PATENT DOCUMENTS

| | | | | |
|---|---|---|---|---|
| 4,738,588 A | * | 4/1988 | Field | F01D 5/186 415/115 |
| 5,062,768 A | * | 11/1991 | Marriage | F01D 5/186 29/889.721 |
| 5,281,084 A | * | 1/1994 | Noe | F01D 5/186 415/115 |
| 5,813,836 A | * | 9/1998 | Starkweather | F01D 5/187 416/97 R |
| 6,092,982 A | * | 7/2000 | Ikeda | F01D 5/186 137/809 |
| 6,155,778 A | * | 12/2000 | Lee | F01D 11/08 415/173.1 |
| 6,176,676 B1 | * | 1/2001 | Ikeda | F01D 25/12 137/809 |
| 6,530,745 B2 | * | 3/2003 | Ciani | F01D 5/187 415/115 |
| 7,597,540 B1 | * | 10/2009 | Liang | F01D 5/186 416/97 R |
| 7,798,776 B1 | * | 9/2010 | Liang | F01D 5/186 415/176 |
| 8,317,473 B1 | * | 11/2012 | Liang | F01D 5/186 416/228 |
| 8,545,180 B1 | * | 10/2013 | Liang | F01D 5/186 416/232 |
| 8,858,176 B1 | * | 10/2014 | Liang | F01D 5/186 416/97 R |
| 10,689,986 B1 | * | 6/2020 | Ameri | F01D 5/186 |
| 2003/0007864 A1 | * | 1/2003 | Shelton | F01D 5/186 415/115 |
| 2003/0068222 A1 | * | 4/2003 | Cunha | F01D 5/189 415/115 |
| 2005/0135932 A1 | * | 6/2005 | Dodd | F01D 5/187 416/97 R |
| 2005/0173388 A1 | * | 8/2005 | Lavers | B23H 9/10 205/665 |
| 2005/0286998 A1 | * | 12/2005 | Lee | B23K 26/384 415/117 |
| 2006/0002796 A1 | * | 1/2006 | Bolms | F01D 5/186 416/97 R |
| 2006/0099074 A1 | * | 5/2006 | Kopmels | F01D 5/186 416/97 R |
| 2006/0104807 A1 | * | 5/2006 | Lee | F01D 5/186 415/115 |
| 2007/0059178 A1 | * | 3/2007 | Shapiro | F01D 11/08 416/181 |
| 2008/0031738 A1 | * | 2/2008 | Lee | F01D 5/186 416/97 R |
| 2008/0095622 A1 | * | 4/2008 | Naik | F01D 5/186 29/889.721 |
| 2008/0183325 A1 | * | 7/2008 | Kriegmair | B23K 26/389 408/1 R |
| 2010/0239409 A1 | * | 9/2010 | Draper | F01D 5/186 29/889.1 |
| 2010/0282721 A1 | * | 11/2010 | Bunker | F01D 25/285 219/121.61 |
| 2011/0097191 A1 | * | 4/2011 | Bunker | F01D 5/186 415/115 |
| 2011/0123312 A1 | * | 5/2011 | Venkataramanan | F01D 5/186 415/115 |
| 2011/0185572 A1 | * | 8/2011 | Wei | B23K 26/389 29/418 |
| 2013/0175015 A1 | * | 7/2013 | Tanaka | F23R 3/06 165/168 |
| 2013/0205786 A1 | * | 8/2013 | Kohli | F01D 5/186 60/722 |
| 2013/0205790 A1 | * | 8/2013 | Xu | F01D 5/186 415/116 |
| 2013/0205791 A1 | * | 8/2013 | Mongillo, Jr. | F01D 5/186 60/806 |
| 2013/0205803 A1 | * | 8/2013 | Xu | F01D 5/186 29/889.22 |
| 2013/0209227 A1 | * | 8/2013 | Xu | F01D 5/186 415/115 |
| 2013/0209228 A1 | * | 8/2013 | Xu | F01D 9/065 415/115 |
| 2013/0209236 A1 | * | 8/2013 | Xu | F01D 9/041 415/116 |
| 2013/0294889 A1 | * | 11/2013 | Malak | F01D 5/186 415/115 |
| 2013/0315710 A1 | * | 11/2013 | Kollati | F01D 5/186 415/116 |
| 2013/0330189 A1 | * | 12/2013 | Garcia-Crespo | F01D 5/187 416/61 |
| 2014/0010632 A1 | * | 1/2014 | Spangler | F01D 9/065 415/115 |
| 2014/0099189 A1 | * | 4/2014 | Morris | F01D 5/186 415/115 |
| 2014/0154096 A1 | * | 6/2014 | Kollati | F01D 5/186 29/889.721 |
| 2014/0234121 A1 | * | 8/2014 | Okita | F01D 5/186 416/97 R |
| 2014/0356188 A1 | * | 12/2014 | Kollati | F01D 5/186 416/235 |
| 2014/0373549 A1 | * | 12/2014 | Mongillo | F01D 25/12 415/177 |
| 2015/0369487 A1 | * | 12/2015 | Dierberger | F23R 3/06 60/755 |
| 2015/0377033 A1 | * | 12/2015 | Xu | F23R 3/02 415/177 |
| 2016/0069192 A1 | * | 3/2016 | Tanaka | B23H 9/10 416/232 |
| 2016/0074969 A1 | * | 3/2016 | Kriegmair | B23K 26/388 700/98 |
| 2016/0076383 A1 | * | 3/2016 | Spangler | F02C 7/18 415/173.1 |
| 2016/0193667 A1 | * | 7/2016 | Luketic | B23B 35/00 408/1 R |
| 2016/0201507 A1 | * | 7/2016 | Bunker | F01D 9/02 415/116 |
| 2016/0326883 A1 | * | 11/2016 | Thornton | F01D 5/186 |
| 2016/0326886 A1 | * | 11/2016 | Lewis | F01D 5/186 |
| 2016/0341048 A1 | * | 11/2016 | Xu | F01D 9/065 |
| 2016/0348513 A1 | * | 12/2016 | Weaver | F01D 5/189 |
| 2016/0369634 A1 | * | 12/2016 | Slavens | F01D 25/12 |
| 2017/0183968 A1 | * | 6/2017 | Xu | F23R 3/002 |
| 2017/0335691 A1 | * | 11/2017 | Crites | F01D 5/186 |
| 2018/0051570 A1 | * | 2/2018 | Lee | F01D 5/186 |
| 2019/0169998 A1 | * | 6/2019 | Whitfield | F01D 5/187 |
| 2020/0024964 A1 | * | 1/2020 | Xu | F23R 3/02 |
| 2020/0386103 A1 | * | 12/2020 | Generale | F01D 5/186 |
| 2021/0189886 A1 | * | 6/2021 | Dyson | F01D 25/12 |
| 2021/0231017 A1 | * | 7/2021 | Crites | F01D 9/065 |
| 2021/0246795 A1 | | 8/2021 | McCaffrey et al. | |
| 2022/0018260 A1 | * | 1/2022 | Mongillo, Jr. | F23R 3/002 |

OTHER PUBLICATIONS

Smialek, J.L., Robinson, R., Opila, E.J., Fox, D.S., and Jacobsen, N.S. (1999). SiC and Si3N4 recession due to SiO2 scale volatility under combustor conditions. NASA/TP-1999208696. Jul. 1999. pp. 1-10.

Deal, B.E. and Grove, A.S. (1965). General relationship for the thermal oxidation of silicon. Journal of Applied Physics. vol. 36(12). Dec. 1965. pp. 3770-3778.

International Search Report and Written Opinion for International Application No. PCT/US2022/047364 dated Nov. 15, 2023.

* cited by examiner

GAS TURBINE ENGINE ARTICLE WITH COOLING HOLES FOR MITIGATING RECESSION

CROSS-REFERENCE TO RELATED APPLICATION

The present disclosure claims priority to U.S. Provisional Application No. 63/270,793 filed Oct. 22, 2021.

STATEMENT REGARDING FEDERALLY SPONSORED RESEARCH OR DEVELOPMENT

This invention was made with Government support awarded by the United States. The Government has certain rights in this invention.

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils and other components in the hot sections of the engine are typically formed of superalloys and may include thermal barrier coatings to extend temperature capability and lifetime. Ceramic materials are also being considered for these components. Among other attractive properties, ceramics have high temperature resistance. Despite this attribute, however, there are unique challenges to implementing ceramics.

SUMMARY

A gas turbine engine article according to an example of the present disclosure includes a silicon-containing ceramic wall having an external combustion gaspath side and an internal side that borders a cooling air cavity. The external combustion gaspath side has an associated combustion gas flow direction there along, and an array of cooling holes extends through the silicon-containing ceramic wall and connects the internal side with the external combustion gaspath side. The cooling holes are oriented to discharge cooling air to the external gaspath side in a direction counter to the combustion gas flow direction.

In a further embodiment of any of the foregoing embodiments, the silicon-containing ceramic wall is situated relative to a gas turbine central axis, and each of the cooling holes has a forward angle relative to the gas turbine central axis of less than 80° and greater than 30°.

In a further embodiment of any of the foregoing embodiments, each of the cooling holes is comprised of a metering hole section of constant cross-sectional area and a surface breakout section that diverges from the metering hole section.

In a further embodiment of any of the foregoing embodiments, the surface breakout section has a lobed geometry.

In a further embodiment of any of the foregoing embodiments, the lobed geometry is a two-lobe geometry.

In a further embodiment of any of the foregoing embodiments, the two-lobe geometry has first and second lobes that are connected to each other at a neck region defined by opposed concave edges of the surface breakout section.

In a further embodiment of any of the foregoing embodiments, the two-lobe geometry has first and second lobes that are connected to each other at a neck region defined by opposed concave and convex edges of the surface breakout section.

In a further embodiment of any of the foregoing embodiments, the surface breakout section has a crescent geometry.

In a further embodiment of any of the foregoing embodiments, the cooling holes are arranged in the array with a ratio of ligament length to cooling hole diameter of 2:1 to 8:1.

In a further embodiment of any of the foregoing embodiments, the array includes at least a first row of the cooling holes and a second row of the cooling holes, the surface breakout section of each of the cooling holes of the first row has a crescent geometry, and the surface breakout section of each of the cooling holes of the second row has a lobed geometry.

In a further embodiment of any of the foregoing embodiments, the cooling holes of the second row are offset from the cooling holes of the first row such that each cooling hole in the second row is intermediate two closest ones of the cooling holes of the first row.

A gas turbine engine according to an example of the present disclosure includes a compressor section, a combustor in fluid communication with the compressor section, and a turbine section in fluid communication with the combustor. At least one of the turbine section or the combustor has an article that includes a silicon-containing ceramic wall that has an external combustion gaspath side and an internal side that borders a cooling air cavity. The external combustion gaspath side has an associated combustion gas flow direction there along, and an array of cooling holes extends through the silicon-containing ceramic wall and connects the internal side with the external combustion gaspath side. The cooling holes are oriented to discharge cooling air to the external gaspath side in a direction counter to the combustion gas flow direction.

In a further embodiment of any of the foregoing embodiments, each of the cooling holes is comprised of a metering hole section of constant cross-sectional area and a surface breakout section that diverges from the metering hole section.

In a further embodiment of any of the foregoing embodiments, the surface breakout section has a lobed geometry or a crescent geometry.

In a further embodiment of any of the foregoing embodiments, the cooling holes are arranged in the array with a ligament length to cooling hole diameter of 2:1 to 8:1, the array includes at least a first row of the cooling holes and a second row of the cooling holes, the surface breakout section of each of the cooling holes of the first row has a crescent geometry, and the surface breakout section of each of the cooling holes of the second row has a lobed geometry.

In a further embodiment of any of the foregoing embodiments, the cooling holes of the second row are offset from the cooling holes of the first row such that each cooling hole in the second row is intermediate two closest ones of the cooling holes of the first row.

A method of mitigating silicon recession according to an example of the present disclosure includes providing the gas turbine engine article as in any of the foregoing examples. Cooling air is emitted from the array of cooling holes in a direction counter to the combustion gas flow direction. The cooling air cools the external combustion gaspath side, shielding it form the combustion gas flow and locally reducing velocity of the combustion gas flow to mitigate silicon recession.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
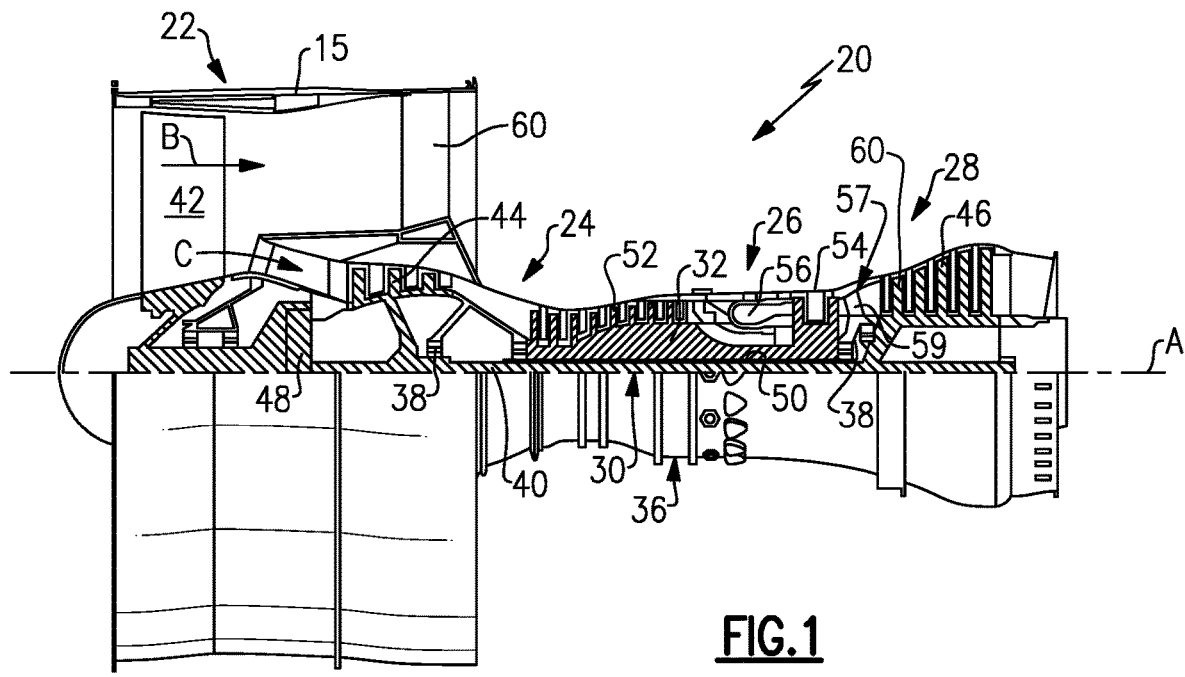
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of

[(Tram ° R)/(518.7° R)]$^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
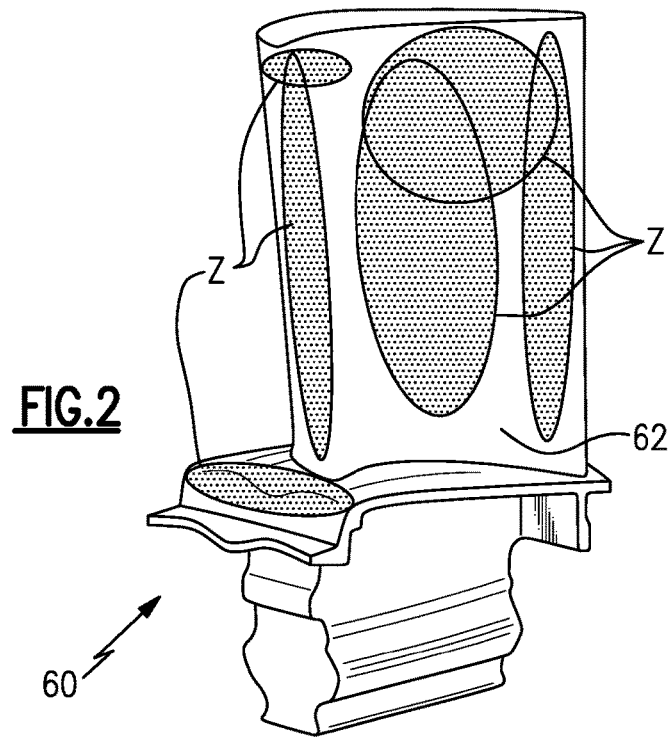
FIG. 2 illustrates an article of the gas turbine engine.

FIG. 2 illustrates an example article 60 from the gas turbine engine 20 to demonstrate aspects of the present disclosure. As shown, the article 60 is a turbine blade. It is to be understood, however, that the examples herein are also applicable to other articles in the hot sections of the engine 20, such as but not limited to, combustor liners, outer air seals, and turbine vanes.

The article 60 includes a wall 62 that is made of a silicon-containing ceramic. The examples that follow are based on silicon-containing ceramic matrix composite (CMC), but it is to be understood that the examples are also applicable to silicon-containing monolithic ceramic or combinations of monolithic ceramic and CMC. The wall 62 may constitute a portion of the article 60, but in the example shown the wall 62 substantially constitutes the whole body of the article 62. The CMC of the wall 62 includes ceramic fiber tows that are disposed in a ceramic matrix. The ceramic matrix composite may be, but is not limited to, a SiC/SiC ceramic matrix composite in which SiC fiber tows are disposed within a SiC matrix. Alternatively, the fibers and/or matrix may be Si$_3$N$_4$. A fiber tow is a bundle of filaments. As an example, a single tow may have several thousand filaments. The tows may be arranged in a fiber architecture, which refers to an ordered arrangement of the tows relative to one another, such as, but not limited to, a 2D woven ply or a 3D structure.

Gas turbine engine components may be exposed to relatively severe temperatures and environmental conditions during operation, especially through the combustor and turbine sections. Although ceramics generally have high temperature and chemical resistance, silicon-containing ceramics can be subject to corrosion. In particular, high velocity, high pressure water vapor in the hot combustion gases of a gas turbine engine can cause recession of silicon-containing CMCs. Recession refers to a reaction between the silicon, oxygen and water to ultimately form volatile species that results in material loss. Environmental barrier coatings (EBCs) may be utilized to mitigate recession. However, additional or alternative mitigation measures may be desirable. In this regard, as described further below, the article 60 includes an array of cooling holes for recession mitigation. In general, an "array" refers to an ordered arrangement of the cooling holes, such as but not limited to, an arrangement of multiple rows of cooling holes in which the holes in each row are regularly spaced. For example, as shown in FIG. 2, the article 60 includes zones Z where there may be high temperatures, high pressures, and high gas flow velocities that create conditions for recession. For instance, on an airfoil, the zones may be at the pressure side, suction side, tip, or leading edge, or on an inner and outer platform, endwall or shroud of the airfoil attachment. An array or arrays of the cooling holes may be provided in one or more of these zones to facilitate mitigation of recession in those locations.

Figure 3:
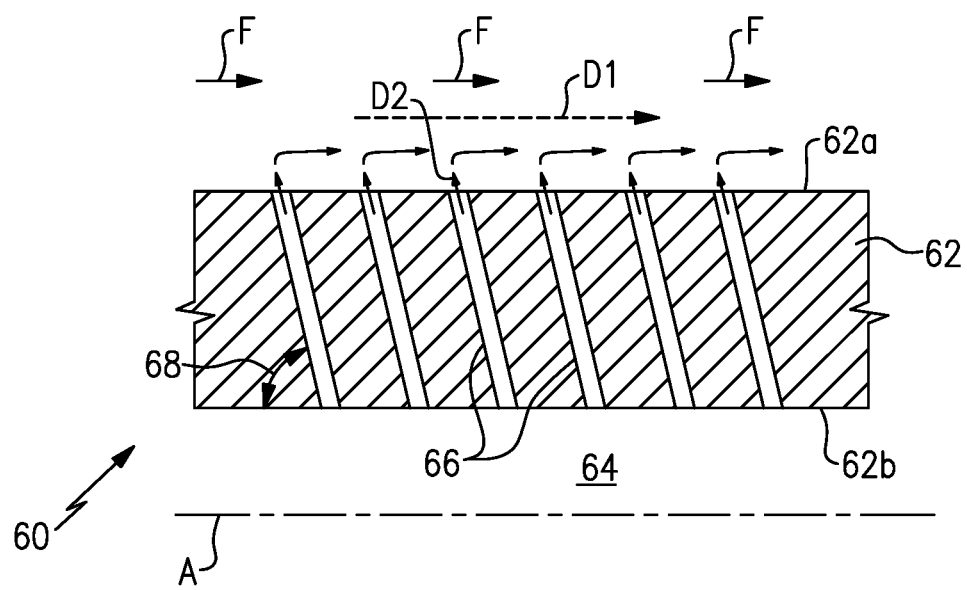
FIG. 3 illustrates a portion of a CMC wall of the article that has an array of cooling holes.

FIG. 3 illustrates a sectioned view of a representative portion of the wall 62 from one of the zones. The wall 62 has an external combustion gaspath side 62a and an internal side 62b. The internal side 62b borders a cooling air cavity 64, such as a cooling passage or core cavity that receives relatively low temperature cooling air from the compressor section 24. The external combustion gaspath side 62a lies in the core flow path of the engine 20, such as on a suction or pressure side of an airfoil or on a radially inner or outer boundary surface of the core flow path. Thus, during engine operation there is a hot combustion gas flow F across the external combustion gaspath side 62a. In general, the flow F is in an axially aft direction in the engine 20 and represents an associated combustion gas flow direction D1 along the external combustion gaspath side 62a. The combustion gas flow direction D1 can be readily determined by those of ordinary skill in the art by computer modeling, for example.

There is an array of cooling holes 66 that extends through the wall 62 and fluidly connects the internal side 62b with the external combustion gaspath side 62a. In this example, each of the cooling holes 66 is circular in cross-section and is of constant cross-section along its entire length. The cooling holes 66 are oriented at a forward angle 68 to discharge cooling air to the external gaspath side 62a in a direction D2 that is counter to the combustion gas flow direction D1. The forward angle 68 is the angle formed by the central axis of a constant cross-sectional section of the cooling hole 66 and the engine central axis A. The "forward" indicates that the angle is forward-leaning, i.e., sloping toward the front of the engine 20. For instance, the angle 68 is less than 80° and greater than 30°, and in a further example is in a range of 65° to 40°. The cooling air that is discharged in the direction D2 is counter to the direction D1 in that there is a forward axial component of the flow of cooling air along D2 that is opposite to the aft axial component of the flow F along direction D1.

The cooling air discharged to the external combustion gas path side 62a of the wall 62 facilitates mitigation of recession. For example, the cooling air cools the external combustion gaspath side 62a, which may serve to reduce the recession reaction rate. As temperature is a factor that determines the reaction rate, reducing the temperature facilitates mitigating recession. Once discharged, the cooling air flows along the external combustion gaspath side 62a as a film to thereby also thermally shield the side 62a from contact with the combustion gas flow F. Additionally, the discharge of the cooling air in direction D2 counter to the combustion gas flow direction D1 locally reduces velocity of the combustion gas flow F in the vicinity of the cooling holes 66. As flow velocity is also a factor that determines the recession reaction rate, reducing the velocity facilitates mitigating recession. In this regard, the forward angle 68 above may be selected to achieve a desired local reduction in the velocity of the combustion gas flow F, with shallower angles producing greater reductions than steeper angles. The discharge of the cooler and drier cooling air in direction D2 counter to the combustion gas flow direction D1 may also serve to locally blow-off hot gases and water vapor from the side 62a, thereby reducing water exposure and further mitigating recession. Additionally, as the cooling air is expected to have a lower moisture content than the combustion gas flow F, which further reduces water exposure of the side 62a.

Figure 4:
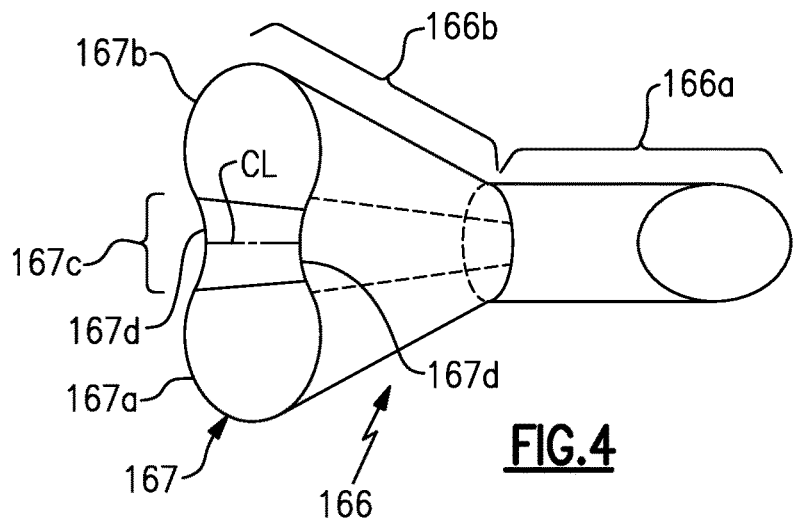
FIG. 4 illustrates an example cooling hole that has a lobed geometry.

The shape of the cooling holes may also be selected to facilitate recession mitigation. FIG. 4 illustrates a representative example of another cooling hole 166 that may be used in place of one or more of the cooling holes 66. The cooling hole 166 is comprised of a metering hole section 166a of constant cross-sectional area and a surface breakout section 166b that diverges from the metering hole section 166a. For instance, the section 166a has a circular cross-section. The surface breakout section 166b in this example has a lobed geometry, generally represented at 167. As shown, the film hole 167 has a two-lobe geometry that includes first and second lobes 167a/167b. The lobes 167a/167b are connected to each other at a neck region 167c that is defined by opposed concave edges 167d of the surface breakout section 166b. For instance, the lobed geometry 167 is symmetric about its centerline CL through the neck region 167c.

The lobed geometry 167 facilitates manipulation of the combustion gas flow F to reduce contact with the external combustion gaspath side 62a. For example, comparison film cooling holes that are directed with the direction D1 (i.e., that have an aft angle) create vortices that tend to circulate the combustion gas flow F toward the side 62a. While such a phenomenon may be desired for some superalloy film cooling strategies and to reduce aerodynamic mixing losses, exposure of the combustion gas flow F to the side 62a is not desired for recession mitigation. In this regard, the forward angle 68 and the lobed geometry counter the tendency to create vortices and thereby provide a film of cooling air that avoids circulating and mixing the combustion gas flow F.

Figure 5:
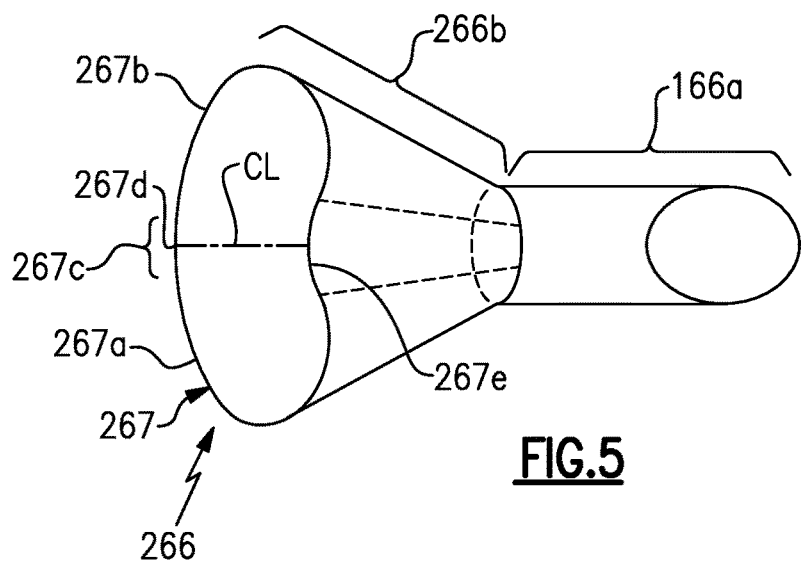
FIG. 5 illustrates a cooling hole that has another lobed geometry.

FIG. 5 illustrates a representative example of another cooling hole 266 that may be used in place of one or more of the cooling holes 66. The cooling hole 266 is comprised of a metering hole section 166a of constant cross-sectional area and a surface breakout section 266b that diverges from the metering hole section 166a. The surface breakout section 266b in this example also has a lobed geometry, generally represented at 267, which may also be considered to be a crescent geometry (discussed further below). As shown, the lobed geometry 267 is a two-lobe geometry that includes first and second lobes 267a/267b. The lobes 267a/267b are connected to each other at a neck region 267c that is defined by opposed convex and concave edges 267d/267e of the surface breakout section 266b. For instance, the lobed geometry 267 is symmetric about its centerline CL through the neck region 267c. Similar to the lobed geometry 167, the lobed geometry 267 facilitates countering the tendency to create vortices and thereby provides a film of cooling air that avoids circulating and mixing the combustion gas flow F. Since lobed hole centerline is at an angle to the surface and the top surface of the film hole 166b is concave, that concavity will provide greater convective cooling to the surface 62a above the hole, reducing temperature and further reduce recession rate.

Figure 6:
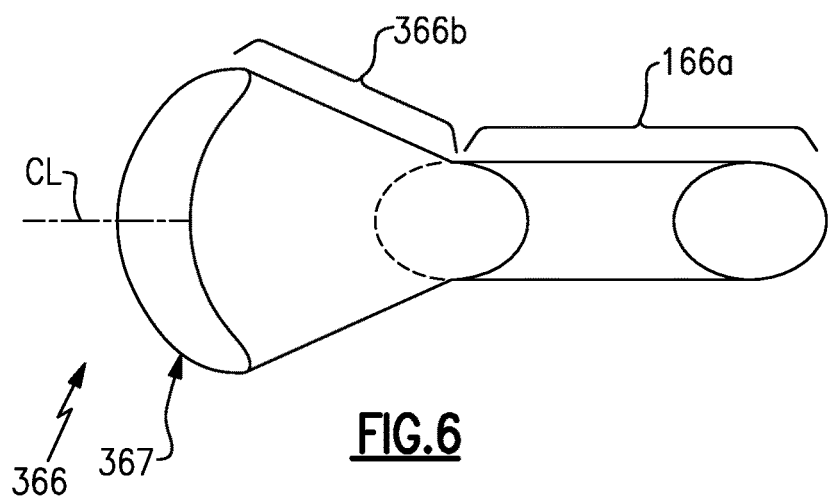
FIG. 6 illustrates a cooling hole that has a crescent geometry.

FIG. 6 illustrates a representative example of another cooling hole 366 that may be used in place of one or more of the cooling holes 66. The cooling hole 366 is again comprised of a metering hole section 166a of constant cross-sectional area and a surface breakout section 366b that diverges from the metering hole section 166a. The surface breakout section 366b in this example has a crescent geometry, generally represented at 367. The "crescent geometry" refers to a profile of surface breakout section 366b, especially at the surface, that is circular, elliptical or other rounded shape and that has one concave side. Most typically, the edges, or endpoints of the crescent, will be rounded rather than sharp points. The circumferential extent of the crescent as taken by its convex side can be anything smaller than a half circle but may be adjusted to achieve a desired cross-sectional area and/or rate of diffusion (expansion of hole cross-sectional area from inlet to outlet). For instance, the crescent geometry 367 in the illustrated example is symmetric about its centerline CL. Similar to the lobed geometries 167/267, the crescent geometry 367 facilitates countering the tendency to create vortices and thereby provides a film of cooling air that avoids circulating and mixing the combustion gas flow F. Since crescent hole centerline is at an angle to the surface and the top surface of the film hole 266b is concave, that concavity will provide greater convective cooling to the surface 62a above the hole, reducing temperature and further reduce recession rate.

Figure 7:
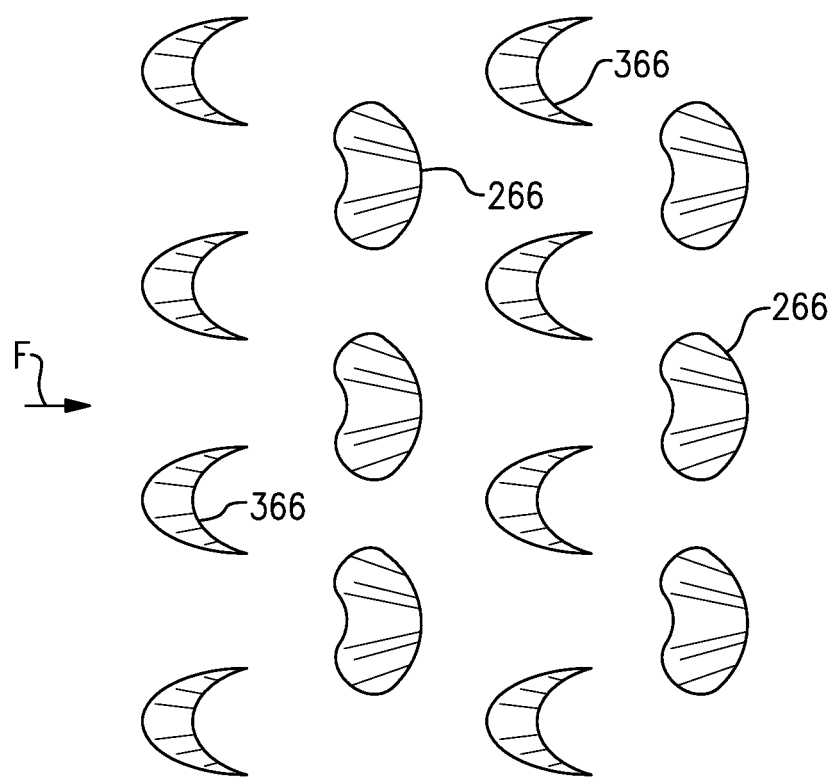
FIG. 7 illustrates an array of cooling holes that have lobed and crescent geometries.

FIG. 7 illustrates an example array or layout of cooling holes 266/366. In this example, the array includes four rows, in which (from left-to-right) the first row and the third row are rows of cooling holes 366 that have the crescent geometry 367 and the second and fourth rows are rows of cooling holes 266 that have the lobed geometry 267. In this example, the crescents of the holes 366 are oriented such that the concave side opens in a downstream direction relative to the combustion gas flow F, and the holes 266 are oriented such that the concave side opens in an upstream direction. The crescent geometry increases the film effectiveness in both the spanwise and streamwise direction downstream and in between the holes 366 by reducing the vortex intensity. The crescent geometries also provide greater film coverage to the next row of holes, hence increased recession protection. The subsequent row of lobed holes 266 is intended to work in tandem with the upstream crescent holes 366 by extending the crescent hole film coverage. The lobed holes 266 act like double-jet holes to generate anti-vortices, but with less penetration of the film jet into the freestream and wider coverage in the spanwise direction. The anti-vortices generated by the lobed holes 266 are intended to counter-act the vortices generated by the upstream crescent holes 366, and thus further reduce mixing with the hot and high water-content gas. Overall, this approach of alternating crescent and lobed rows facilitates enhancement of the film coverage over a wider area, reducing both temperature and water vapor content over the largest surface area possible, and leading to reduced recession.

As will be appreciated, some or all of the holes 266 could alternatively be the holes 166 with the lobed geometry 167. As shown, the first and third rows are aligned with each other, and the second and fourth rows are aligned with each other. The second and fourth rows are also offset from the first and third rows such that each cooling hole 266 is intermediate two closest ones of the cooling holes 366 in the first row. The cooling holes 366/266 are arranged in the array with a ratio of ligament length to cooling hole diameter of 2:1 to 8:1. The term "aligned" or variations thereof is made with reference to the locations of common reference points of the cooling holes 66/166/266/366 that lie on a common plane, such as but not limited to, centerpoints on the surface plane of the surface breakout sections 166b/266b/366b or points on the central axes of the metering holes section 166a. For the purpose of determining the ligament length, the cooling hole diameter is the diameter of the metering hole section 166a or, if there is no constant cross-section section or if the metering hole section is non-circular, the minimum dimension of the cooling hole. The ligament length is the dimension of the material between cooling holes. The arrangement of alternating rows of crescent holes 366 and lobed shaped holes 266 are intended to interact with each other to protect the surface from hot combustion product gases. It is expected that film cooling air ejected from the upstream crescent shaped holes will generate vortices that circulate around lines that emanate from the sharp points of the crescent and flow downstream. These cooling vortices rotate so as entrain hot combustion product gases from above and outside of the cooling air jet down to the surface and in towards the center of the crescent downstream of the hole. This action can be counteracted somewhat by alternating lobed shaped holes 266 downstream of the crescent as shown. The lobe shaped holes 266 will generate vortices that rotate counter-oriented to the vortices generated by the upstream crescent holes 366. In a similar fashion, the counter-rotating vortices from the lobed shaped holes will proceed downstream to the next row of crescent holes that generate counter-rotating vortices against those.

The array provides a full film of cooling air over the local portion of the external gaspath side 62a of the wall 62 where the cooling holes are located. In this regard, the hole spacing provides a relatively dense array to reduce gaps in the cooling film. Moreover, the cross-sectional area of the cooling holes may be smaller than those used for film cooling of superalloys, which facilitates lowering of the momentum blowing ratio and reduction in aerodynamic mixing losses. For instance, the cooling hole diameter is as small as about 0.25 to 0.4 millimeters, which facilitates dirt plugging and also minimizes the amount of material that must be removed during manufacturing to produce the cooling hole Minimum ligament length that still meets strength/durability objectives and minimum cooling hole cross-sectional size that is practically manufacturable may facilitate provision of a full-coverage cooling film, for recession mitigation.

The disclosure above is also exemplary of a method of mitigating recession. For example, the method includes providing the article 20 and emitting the cooling air from the array of cooling holes in a direction counter to the combustion gas flow direction, as discussed above. The cooling air cools the external combustion gaspath side 62a, shields the external combustion gaspath side 62a from the combustion gas flow, and locally reduces velocity of the combustion gas flow to mitigate recession. These effects may be enhanced by using the minimum cooling hole size that is manufacturable Methods for manufacturing the article and cooling holes described herein are not particularly limited. Known ceramic processing techniques, such as but not limited to, fiber ply lay-up and chemical vapor deposition may be used. Cooling holes may be formed via machining, such as but not limited to, electro-discharge machining, laser machining, and water-jet laser machining or by use of sacrificial inserts, such as carbon rods that are later thermally or chemically removed. Given this description, one of ordinary skill in the art will be able to determine manufacturing processes that are suitable for their particular implementation.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine article comprising:
a silicon-containing ceramic wall having an external combustion gas path side and an internal side that borders a cooling air cavity, the external combustion gas path side having an associated combustion gas flow direction along the external combustion gas path side; and
an array of cooling holes extending through the silicon-containing ceramic wall and connecting the internal side with the external combustion gas path side, the cooling holes being oriented to discharge cooling air to the external combustion gas path side in a direction counter to the combustion gas flow direction, each of the cooling holes being comprised of a metering hole section of constant cross-sectional area and a surface breakout section that diverges from the metering hole section, the array including at least a first row of the cooling holes and a second row of the cooling holes, the surface breakout section of each of the cooling holes of the first row having a crescent geometry, and the surface breakout section of each of the cooling holes of the second row having a lobed geometry.

2. The gas turbine engine article as recited in claim 1, wherein the silicon-containing ceramic wall is situated relative to a gas turbine central axis, and each of the cooling holes has a forward angle relative to the gas turbine central axis of less than 80° and greater than 30°.

3. The gas turbine engine article as recited in claim 1, wherein the lobed geometry is a two-lobe geometry.

4. The gas turbine engine article as recited in claim 3, wherein the two-lobe geometry has first and second lobes that are connected to each other at a neck region defined by opposed concave edges of the surface breakout section.

5. The gas turbine engine article as recited in claim 3, wherein the two-lobe geometry has first and second lobes that are connected to each other at a neck region defined by opposed concave and convex edges of the surface breakout section.

6. The gas turbine engine article as recited in claim 1, wherein the cooling holes are arranged in the array with a ratio of ligament length to cooling hole diameter of 2:1 to 8:1.

7. The gas turbine engine article as recited in claim 1, wherein the cooling holes of the second row are offset from the cooling holes of the first row such that each cooling hole in the second row is intermediate two closest ones of the cooling holes of the first row.

8. A gas turbine engine comprising:
a compressor section;
a combustor in fluid communication with the compressor section; and
a turbine section in fluid communication with the combustor, at least one of the turbine section or the combustor having an article that includes:
a silicon-containing ceramic wall having an external combustion gas path side and an internal side that borders a cooling air cavity, the external combustion gas path side having an associated combustion gas flow direction along the external combustion gas path side, and
an array of cooling holes extending through the silicon-containing ceramic wall and connecting the internal side with the external combustion gas path side, the cooling holes being oriented to discharge cooling air to the external combustion gas path side in a direction counter to the combustion gas flow direction, each of the cooling holes being comprised of a metering hole section of constant cross-sectional area and a surface breakout section that diverges from the metering hole section, the cooling holes being arranged in the array with a ligament length to cooling hole diameter of 2:1 to 8:1, the array including at least a first row of the cooling holes and a second row of the cooling holes, the surface breakout section of each of the cooling holes of the first row having a crescent geometry, and the surface breakout section of each of the cooling holes of the second row having a lobed geometry.

9. The gas turbine engine as recited in claim 8, wherein the cooling holes of the second row are offset from the cooling holes of the first row such that each cooling hole in the second row is intermediate two closest ones of the cooling holes of the first row.

10. A method of mitigating silicon recession, the method comprising:

providing a gas turbine engine article in a gas turbine engine, the gas turbine engine article includes a silicon-containing ceramic wall that has an external combustion gas path side and an internal side that borders a cooling air cavity, and an array of cooling holes that extend through the silicon-containing ceramic wall and that connect the internal side with the external combustion gas path side, wherein there is a combustion gas flow across the external combustion gas path side along an associated combustion gas flow direction; and emitting cooling air from the array of cooling holes in a direction counter to the combustion gas flow direction, the cooling air cooling the external combustion gas path side-, shielding the external combustion gas path side from the combustion gas flow, and locally reducing velocity of the combustion gas flow to mitigate silicon recession, each of the cooling holes being comprised of a metering hole section of constant cross-sectional area and a surface breakout section that diverges from the metering hole section, the cooling holes being arranged in the array with a ligament length to cooling hole diameter of 2:1 to 8:1, the array including at least a first row of the cooling holes and a second row of the cooling holes, the surface breakout section of each of the cooling holes of the first row has a crescent geometry, and the surface breakout section of each of the cooling holes of the second row has a lobed geometry.

* * * * *